United States Patent
Thomas

(10) Patent No.: US 10,114,563 B2
(45) Date of Patent: Oct. 30, 2018

(54) PROVIDING REDUNDANCY IN A VIRTUALIZED STORAGE SYSTEM FOR A COMPUTER SYSTEM

(71) Applicant: International Business Machines Corporation, Armonk, NY (US)

(72) Inventor: Mark B. Thomas, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/500,868

(22) Filed: Sep. 29, 2014

(65) Prior Publication Data

US 2015/0019809 A1    Jan. 15, 2015

Related U.S. Application Data

(63) Continuation of application No. 12/703,456, filed on Feb. 10, 2010, now Pat. No. 8,880,843.

(51) Int. Cl.
| | |
|---|---|
| *G06F 12/00* | (2006.01) |
| *G06F 3/06* | (2006.01) |
| *G06F 11/10* | (2006.01) |
| *G06F 12/02* | (2006.01) |
| *G06F 11/20* | (2006.01) |

(52) U.S. Cl.
CPC .......... *G06F 3/0619* (2013.01); *G06F 3/0631* (2013.01); *G06F 3/0665* (2013.01); *G06F 3/0689* (2013.01); *G06F 11/1092* (2013.01); *G06F 11/2094* (2013.01); *G06F 12/023* (2013.01); *G06F 11/2087* (2013.01);
(Continued)

(58) Field of Classification Search
CPC .. G06F 3/0619; G06F 11/2094; G06F 3/0631; G06F 3/0689
See application file for complete search history.

(56) References Cited

U.S. PATENT DOCUMENTS

| | | | |
|---|---|---|---|
| 5,623,418 A | 4/1997 | Rostoker et al. | |
| 6,000,006 A | * 12/1999 | Bruce | ................. G06F 11/1068 711/103 |

(Continued)

OTHER PUBLICATIONS

U.S. Non-Final Office Action for U.S. Appl. No. 12/703,456 dated Mar. 22, 2012.

(Continued)

*Primary Examiner* — Gurtej Bansal
(74) *Attorney, Agent, or Firm* — Sherman IP LLP; Kenneth L. Sherman; Hemavathy Perumal

(57) ABSTRACT

A method for providing redundancy in a virtualized storage system for a computer system is provided. The method includes determining first set of first logical addresses to provide a virtual storage volume. A redundancy schema is then selected to provide redundancy data for primary data stored in the first set of first logical addresses. A second set of second logical addresses is determined to provide logical storage for the primary data and for the redundancy data. The first set of first logical addresses and the second set of second logical addresses are then mapped and a set of physical addresses is selected from a set of physical storage elements. Mapping between the second set of second logical addresses and the set of physical addresses is then performed to provide physical storage for the primary data and the redundancy data stored in the virtual storage volume.

20 Claims, 8 Drawing Sheets

(52) U.S. Cl.
CPC ............... *G06F 2201/815* (2013.01); *G06F 2212/1032* (2013.01); *G06F 2212/262* (2013.01)

(56) References Cited

U.S. PATENT DOCUMENTS

| | | |
|---|---|---|
| 6,332,177 B1 | 12/2001 | Humlicek |
| 6,983,355 B2 | 1/2006 | Ripberger et al. |
| 7,013,379 B1 | 3/2006 | Testardi |
| 7,047,358 B2 | 5/2006 | Lee et al. |
| 7,055,058 B2 | 5/2006 | Lee et al. |
| 7,395,370 B2 | 7/2008 | Ukai et al. |
| 7,421,537 B2 | 9/2008 | Corrado |
| 7,761,834 B2 | 7/2010 | McConaghy et al. |
| 7,925,925 B2 | 4/2011 | Royer et al. |
| 7,990,375 B2 | 8/2011 | Kohli et al. |
| 8,074,017 B2 | 12/2011 | Cavallo |
| 8,127,076 B2 | 2/2012 | Galloway et al. |
| 8,145,841 B2 * | 3/2012 | Galloway ........... G06F 11/1076 711/114 |
| 8,387,063 B2 | 2/2013 | Koseki et al. |
| 8,498,997 B2 | 7/2013 | Murase |
| 2002/0161972 A1 * | 10/2002 | Talagala ............. G06F 11/1076 711/114 |
| 2005/0050294 A1 | 3/2005 | Horn et al. |
| 2006/0004795 A1 | 1/2006 | Shah et al. |
| 2006/0101368 A1 | 5/2006 | Kesarwani et al. |
| 2008/0005468 A1 | 1/2008 | Faibish et al. |
| 2008/0288436 A1 * | 11/2008 | Priyanv ............... G06F 12/0246 706/48 |
| 2009/0164702 A1 * | 6/2009 | Kern .................. G06F 12/0246 711/103 |
| 2011/0153976 A1 * | 6/2011 | Tamura ................ G06F 3/0608 711/170 |

OTHER PUBLICATIONS

U.S. Final Office Action for U.S. Appl. No. 12/703,456 dated Aug. 28, 2012.
U.S. Non-Final Office Action for U.S. Appl. No. 12/703,456 dated Dec. 27, 2013.
U.S. Final Office Action for U.S. Appl. No. 12/703,456 dated May 6, 2014.
U.S. Notice of Allowance for U.S. Appl. No. 12/703,456 dated Jun. 30, 2014.

* cited by examiner

| Public Virtual LUN & LBA | Internal Virtual LUN & LBA | Parity Data Link | Physical LUN & LBA | Block Data Type |
|---|---|---|---|---|
| pLUN 1 LBA 1-512 | iLUN 1 LBA 1-512 | LBA 3585-4096 | Disc ID 7 LBA 3585-4096 | Primary Data 1 |
| pLUN 1 LBA 513-1024 | iLUN 1 LBA 513-1024 | LBA 3585-4096 | Disc ID 5 LBA 7681-8192 | Primary Data 2 |
| pLUN 1 LBA 1025-1536 | iLUN 1 LBA 1025-1536 | LBA 3585-4096 | Disc ID 9 LBA 3585-4096 | Primary Data 3 |
| pLUN 1 LBA 1537-2048 | iLUN 1 LBA 1537-2048 | LBA 3585-4096 | Disc ID 15 LBA 3073-3584 | Primary Data 4 |
| pLUN 1 LBA 2049-2560 | iLUN 1 LBA 2049-2560 | LBA 3585-4096 | Disc ID 1 LBA 1-512 | Primary Data 5 |
| pLUN 1 LBA 2561-3072 | iLUN 1 LBA 2561-3072 | LBA 3585-4096 | Disc ID 2 LUN 4609-5120 | Primary Data 6 |
| pLUN 1 LBA 3073-3584 | iLUN 1 LBA 3073-3584 | LBA 3585-4096 | Disc ID 3 LBA 2561-3072 | Primary Data 7 |
| | iLUN 1 LBA 3585-4096 | LBA 1-3584 | Disc ID 13 LBA 4097-4608 | Parity Data (P) |
| pLUN 4 LBA 1-512 | iLUN 4 LBA 1-512 | LBA 513-1024 | Disc ID 12 LBA 513-1024 | Primary Data 1 |
| | iLUN 4 LBA 513-1024 | LBA 1-512 | Disc ID 8 LBA 2049-2560 | Primary Data 1 |

Figure 4

PROVIDING REDUNDANCY IN A VIRTUALIZED STORAGE SYSTEM FOR A COMPUTER SYSTEM

BACKGROUND OF THE INVENTION

1. Field of the Invention

The present invention relates generally to data storage systems, and more particularly, to a system and method for providing redundancy in a virtualized storage system for a computer system.

2. Background Information

Large computer data storage systems commonly comprise storage arrays such as known Redundant Array of Independent Disk (RAID) arrays. RAID arrays include RAID controllers that generally use redundancy plans, or schemas, to provide data redundancy for the array. Such RAID controllers may be configured to aggregate groups of disks into RAID arrays to provide redundancy at disk level. Several RAID arrays of the same RAID type may then be pooled. Virtual volumes can then be selected from groups of blocks (extents) from one or more of the RAID arrays. The virtual volumes are then made available for use by one or more host computers.

One problem with such RAID arrays occurs when rebuilding failed disks. Since rebuilds occur at the array level, all volumes in the pool are at risk of data loss. Large disk rebuilds may take many hours, increasing the probability of data loss. Furthermore, one set of disks can only provide storage space to volumes of one RAID type. This increases the complexity of the management of the storage system as the number of arrays of each RAID type needed for the required volumes must be established.

Some levels of RAID algorithm, such as RAID 5, suffer from a problem known in the art as "RAID write hole." This problem occurs when writes of primary data and its corresponding redundancy data, such as parity data, are non-atomic. If the write is interrupted after the primary data has been written but before the redundancy data has been written, the redundancy data may become inconsistent with its corresponding primary data and is thus corrupted. This problem may be accepted in some systems as a reasonable risk or can worked around using non-volatile storage to cache the primary and redundancy data until it is successfully written. However, such non-volatile storage is relatively expensive.

SUMMARY OF THE INVENTION

The foregoing problems are solved and an advance in the art is obtained by a novel method for providing redundancy in a virtualized storage system for a computer system.

In one embodiment, the method includes determining a first set of first logical addresses to provide a virtual storage volume. A redundancy schema is then selected to provide redundancy data for primary data stored in the first set of first logical addresses. A second set of second logical addresses is determined to provide logical storage for the primary data and for the redundancy data. The first set of first logical addresses and the second set of second logical addresses are then mapped and a set of physical addresses is selected from a set of physical storage elements. Mapping between the second set of second logical addresses and the set of physical addresses is then performed to provide physical storage for the primary data and redundancy data stored in the virtual storage volume.

In another embodiment, a computer program product that comprises a computer usable medium having computer usable program code embodied therewith. The computer usable program code comprises computer usable program code configured to determine a first set of first logical addresses to provide a virtual storage volume. The computer usable program code is configured to next select a redundancy schema to provide redundancy data for primary data stored in the first set of first logical addresses. The computer usable program code then determines a second set of second logical addresses to provide logical storage for the primary data and for the redundancy data. The computer usable program code is configured to next map between the first set of first logical addresses and the second set of second logical addresses, and then select a set of physical addresses from a set of physical storage elements. The computer usable program code is configured to then map between the second set of second logical addresses and the set of physical addresses to provide physical storage for the primary data and redundancy data stored in the virtual storage volume.

In another embodiment, a method for providing a virtualized storage array comprising a redundancy schema. The method comprising the steps of providing an array of virtual storage elements comprising segments allocated from a plurality of storage elements, applying a RAID schema to the array for providing a RAID array from the virtual storage elements, and presenting the RAID array for use as a storage array in a computer system.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 4 is a table illustrating address mappings for virtual storage volumes;

DESCRIPTION OF THE PREFERRED EMBODIMENTS

Figure 1:
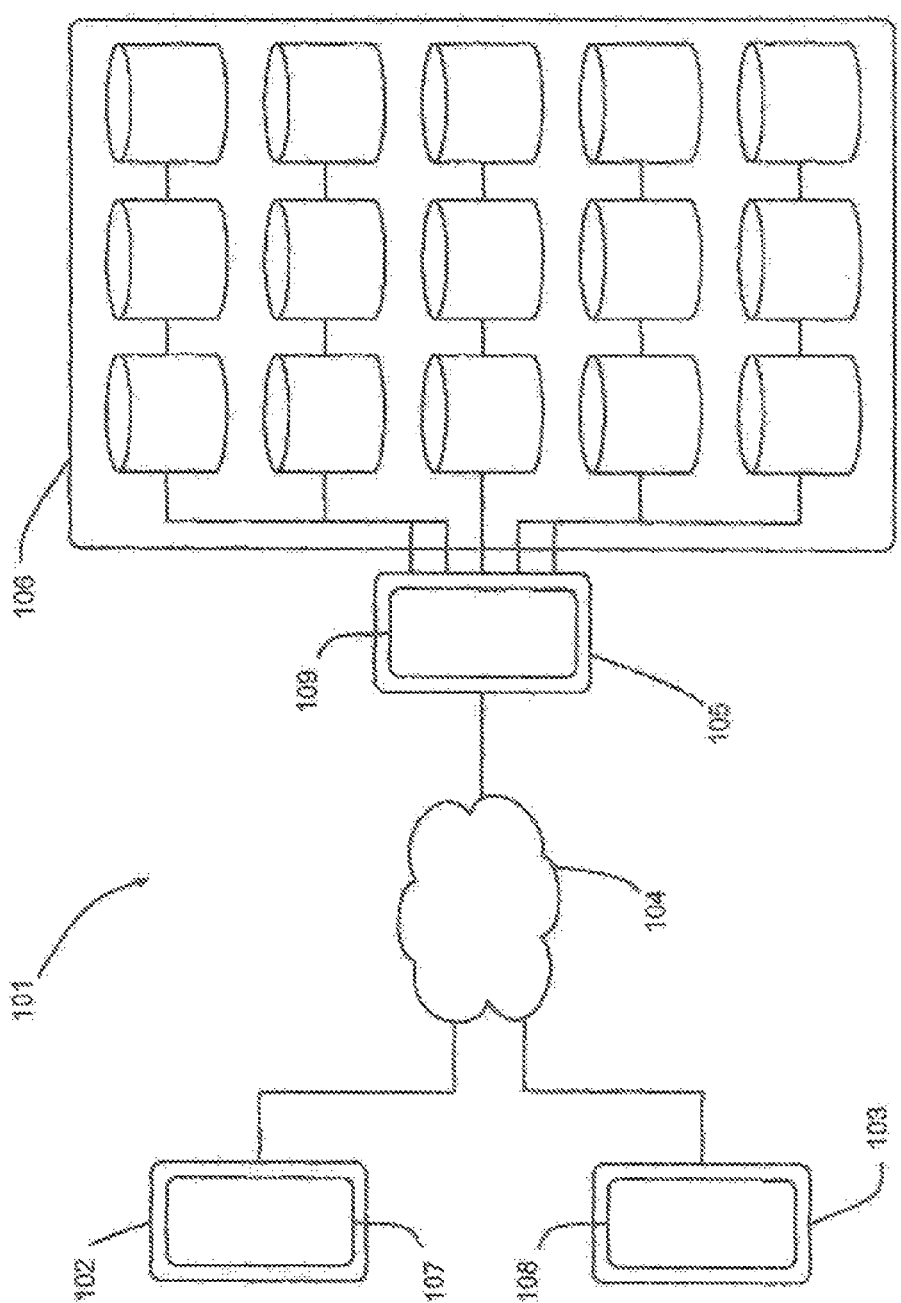
FIG. 1 is a schematic illustration of a computer system comprising an array controller and an associated array of storage devices.

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

An embodiment of the invention comprises a method for providing redundancy in a virtualized storage system for a computer system. In one embodiment, the method includes determining a first set of first logical addresses for providing a virtual storage volume, selecting a redundancy schema for providing redundancy data for primary data stored in the first set of first logical addresses, determining a second set of second logical addresses for providing logical storage for the primary data and for the redundancy data, mapping between the first set of first logical addresses and the second set of second logical addresses, selecting a set of physical storage addresses from a set of physical storage elements, and then mapping between the second set of second logical addresses and the set of physical addresses for providing physical storage for the primary data and the redundancy data stored in the virtual storage volume.

Referring to FIG. 1, there is shown generally at 101, a computer system comprising two computers 102, 103 connected to a storage array controller 105, via a network 104. In one embodiment, the storage array controller 105 comprises a Redundant Array of Independent Discs (RAID) controller, and is connected to an array of storage devices 106. In an exemplary embodiment, the array of storage devices 106 may comprise an array discs. Each computer 102, 103 is loaded with an operating system 107, 108 that is configured to enable access to the RAID controller 105 over the network 104. The RAID controller 105 is loaded with a RAID controller program 109 configured to provide access to the storage devices 106 for storing and retrieving data. In addition, the RAID controller program 109 is configured to provide data redundancy for the stored data, to reduce the chance of data being lost in the event of one or more of the storage devices becoming inaccessible or failing.

Figure 2:
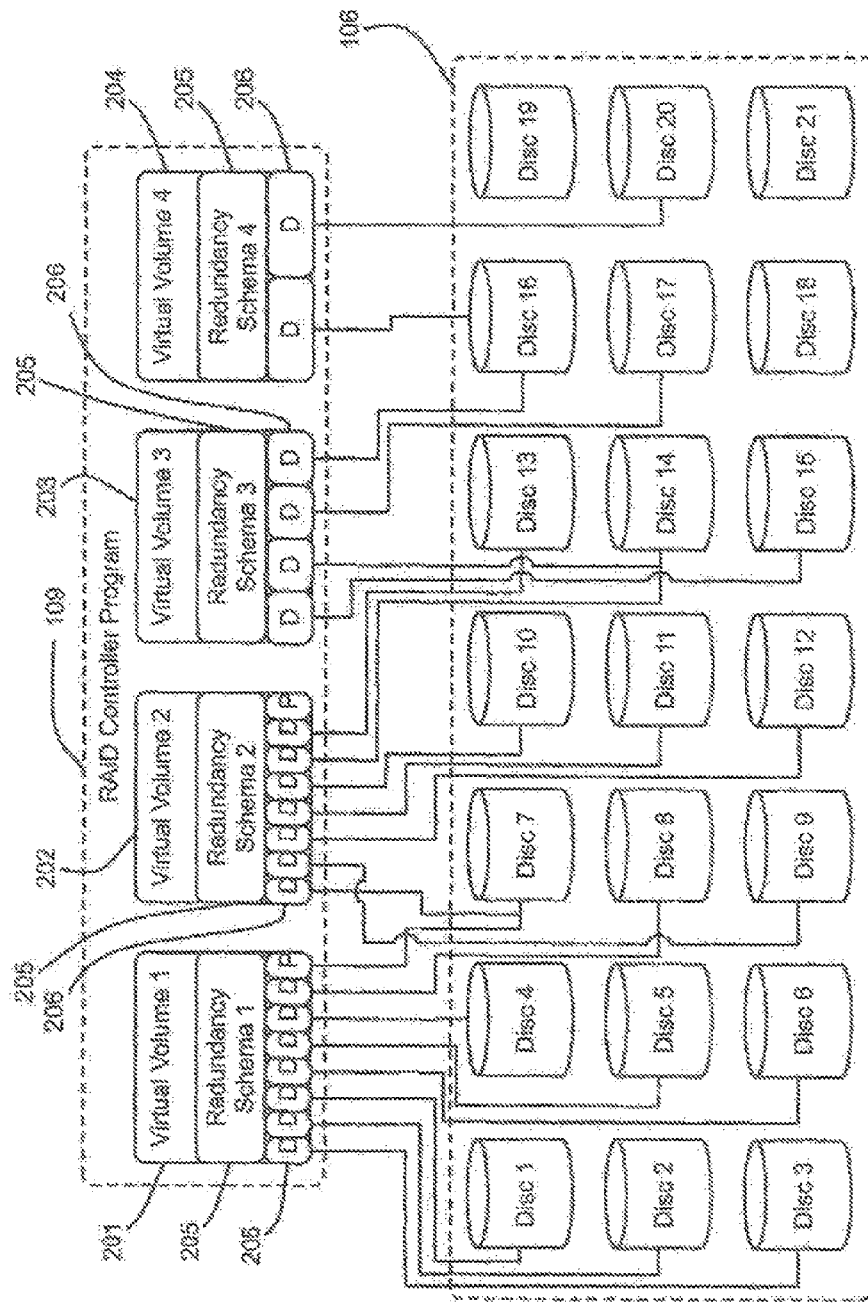
FIG. 2 is a schematic illustration of a set of virtual volumes.

Referring to FIG. 2, in an exemplary embodiment, the RAID controller program 109 is configured to provide four virtual volumes: Virtual Volume 1 201, Virtual Volume 2

202, Virtual Volume 3 203, and Virtual Volume 4 204. The virtual volumes 201, 202, 203, 204 are provided over the network 104 for use by application programs running on the computers 102, 103. Each virtual volume 201, 202, 203, 204 is configured to use a predetermined redundancy schema 205, such as a RAID algorithm, to provide data redundancy and depending on the particular redundancy schema used, to provide high input/output performance.

Each virtual volume 201, 202, 203, 204 provides a first array of virtual logical addresses that provide public address space for the volume. The redundancy schema 205 is applied to this first array of virtual logical addresses. Redundancy may be provided by mirroring data, striping data, or creating error correction data, such as parity data. Thus, redundancy schemas can require a larger address space than the public virtual address space where they are applied.

In one embodiment, the larger address space required by the redundancy schemas is provided by a respective second array of virtual logical addresses 206 of each virtual volume 201, 202, 203, 204. Each second array of virtual logical addresses 206 is allocated from a corresponding array of physical logical addresses from the physical storage devices 106. In summary, the first array of virtual logical addresses is mapped, in accordance with the associated redundancy schema 205, to a respective second array of virtual logical addresses 206, which are mapped to physical logical addresses as described hereinafter.

Figure 3:
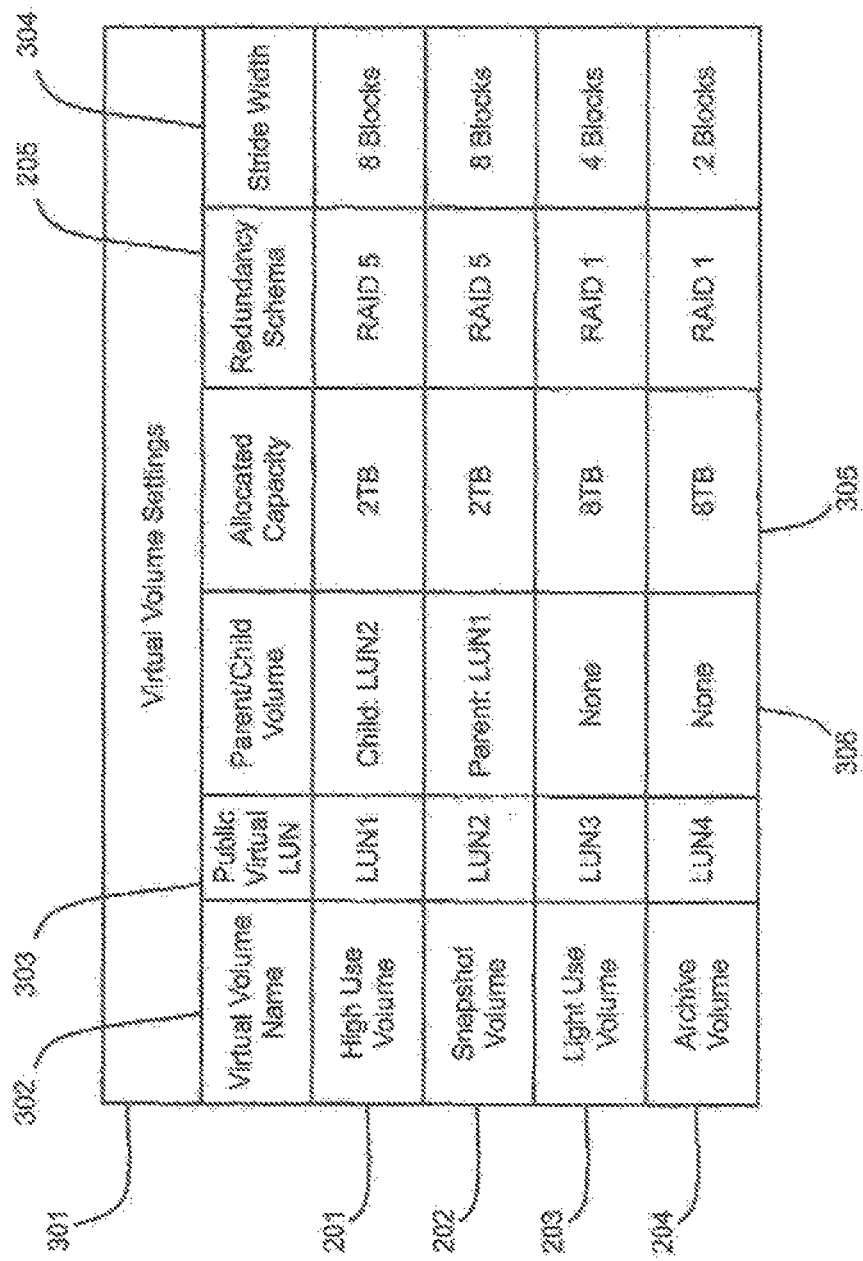
FIG. 3 is a table of settings used by an array controller for a set of virtual storage volumes.

With reference to FIG. 3, the RAID controller program 109 is arranged to build the virtual volumes 201, 202, 203, 204 in accordance with a set of settings 301 provided by a user. In one embodiment, a user labels each volume with a name 302. Once named, a next free public virtual logical unit number (LUN) 303 is assigned to the volume. The applicable redundancy schema 205 is specified along with the number of addresses (blocks), referred to herein as the stride width 304, of the second array of virtual logical addresses 206 to which the redundancy schema is applied. The stride width 304 can be viewed as equivalent to the number of discrete storage devices, such as discs, employed in a physical RAID array. The allocated capacity 305 is specified, which determines the amount of the physical storage 106 that can be allocated to the given volume. The allocated capacity 305, stride width 304, and redundancy schema 205 govern the actual capacity of the resulting virtual volume 201, 202, 203, 204. For groups of two or more volumes, a parent-child relationship may be specified. This relationship can be used when creating snapshots of volumes. The snapshot volume is defined as a child volume to the parent volume that is being copied.

Referring to FIG. 4, in response to the settings 301 for a new volume, the RAID controller program 109 is arranged to create metadata for the new volume in the form of an address-mapping table 401. The address-mapping table 401 provides a first mapping between the first array of virtual logical addresses 402 and the second array of virtual logical addresses 206. The first mapping is created in accordance with the associated redundancy schema 205. The address-mapping table 401 provides a second mapping between the second array of virtual logical addresses 206 and the corresponding array of physical logical addresses 403.

The address-mapping table 401 also provides an indication of the type of data stored in a given block by means of the block data type 404. For example, a block may be used to store primary data or redundancy data such as parity data or mirrored data. When the data is parity data, a parity/data link 405 is provided for cross-referencing each relevant primary data virtual logical address 206 with the relevant parity data virtual logical address. Each virtual or physical logical address comprises a Logical Unit Number (LUN) and a Logical Block Address (LBA) range referring to a group of 512 logical blocks, with each logical block comprising 512 bytes. Individual addresses within these 256 kilobyte groups of blocks are accessed using an offset.

Referring to FIG. 3 and FIG. 4, the first eight lines in the table 401 represent example address mappings for the first virtual volume 201. The first volume 201 applies a known RAID 5 redundancy algorithm 205. RAID 5 redundancy algorithms are typically defined as blockwise striping with parity. In one embodiment, the first volume 201 applies a known RAID 5 redundancy algorithm, where the primary data is striped over successive blocks, and redundancy data, in the form of parity data, that is calculated for the corresponding set of blocks The first volume 201 is specified with an 8-block stride width 304 and applying a RAID 5 algorithm over eight blocks results in data striped across seven public blocks, with the remaining block used for parity data. Thus, the seven public blocks comprise the first seven public virtual logical addresses 402 of the first virtual volume 201 that are mapped to seven internal virtual logical addresses 206. An eighth internal virtual logical address 206 is assigned for the parity data block. In one embodiment, the parity data block is not assigned a public virtual logical address 402 as it comprises data that is internal to the redundancy algorithm 205. Data/parity links 405 are added, in the form of the relevant internal virtual logical address 206, in order to cross-reference the primary data blocks and the corresponding parity data block. Each of the internal virtual logical address 206 is allocated a corresponding physical logical address from the physical storage devices 106. In order to ensure that no two blocks are vulnerable to the failure of a given storage element 106, no two blocks for a given stride are allocated to the same physical storage element 106. The data block types 404 are updated in accordance with the RAID 5 redundancy algorithm, resulting in a series of seven primary data blocks followed by a parity data block.

The ninth and tenth lines of table 401 show example address mappings for the first stride of the fourth virtual volume 204. In accordance with the settings 301, the fourth virtual volume 204 applies a RAID 1 redundancy schema 205 to a two-block stride width 304. A RAID 1 redundancy schema 205 comprises mirroring data over successive blocks. Thus, the public address space for the fourth virtual volume 204 comprises a sequence of public virtual logical addresses 402 that each map to two internal virtual addresses 206 via the cross-referencing in the parity/date link entry 405. As shown in the table 401, the block data types for each of the internal virtual addresses 206 are identical indicating that the corresponding data is mirrored. Again, in order to ensure that no two blocks are vulnerable to the failure of a given storage element 106, no two blocks for a given stride are allocated to the same physical storage element 106.

The flowcharts hereinafter illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
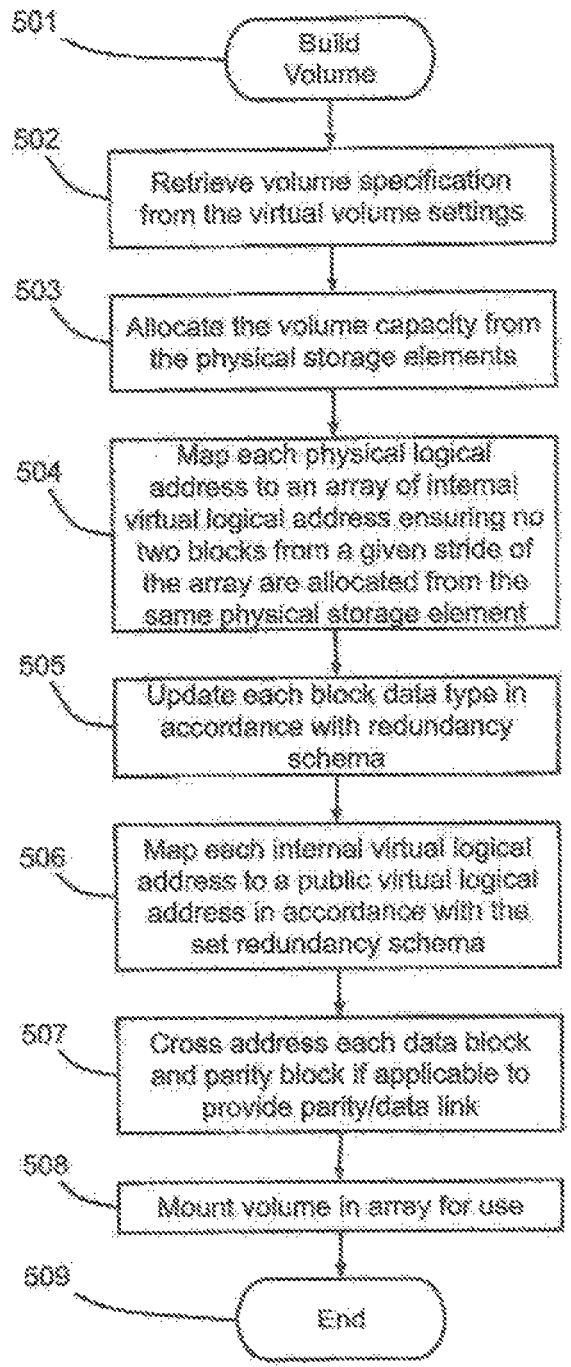
FIG. 5 is a flow chart illustrating a process of building a virtual volume.

Referring to FIG. 5, processing performed by the RAID controller program 109 when building a virtual volume 201, 202, 203, 204 in accordance with the respective setting 301 is shown. Processing is initiated at step 501, in response to the receipt of a build command from a user having entered settings for a new volume and moves to step 502. At step 502, the settings for the new volume are retrieved from the virtual volume settings 301. At step 503, the allocated capacity 305 for the volume is allocated from the physical storage elements 106 and processing moves to step 504. Each physical logical address is mapped to an array of internal virtual logical address 206, shown at step 504. The array of internal virtual logical addresses 206 is created ensuring that no two internal virtual logical addresses 206 in the same stride of the array are mapped to physical logical addresses 402 on the same physical storage element 106. Processing then moves to step 505, where the block data type 404 is entered for each internal virtual logical address 206 in accordance with the redundancy schema 205 and stride width 304 defined in the settings 301.

At step 506, each applicable internal virtual logical address 206 is mapped to a corresponding public virtual logical address 402 in accordance with the redundancy schema 205. In one embodiment, for a RAID algorithm providing redundancy data for the primary data via parity or hashing data, only the internal virtual logical addresses 206 with a primary data block data type are mapped to a corresponding public virtual logical address 402. For a RAID algorithm providing redundancy for the primary data via mirroring, in one embodiment, only one of the mirrored data block internal virtual logical addresses 206 is mapped to a public virtual logical address 402 with the mirrored data addressed via the parity/data link 405. Processing then moves to step 507, where cross addressing between redundancy data and primary data is entered for the parity/data link 405 for each internal virtual logical address 206 in accordance with the applicable redundancy schema 205. At step 508, where the new virtual volume is mounted in the array of virtual volumes provided by the RAID controller program 109. Processing then ends at step 509.

Figure 6:
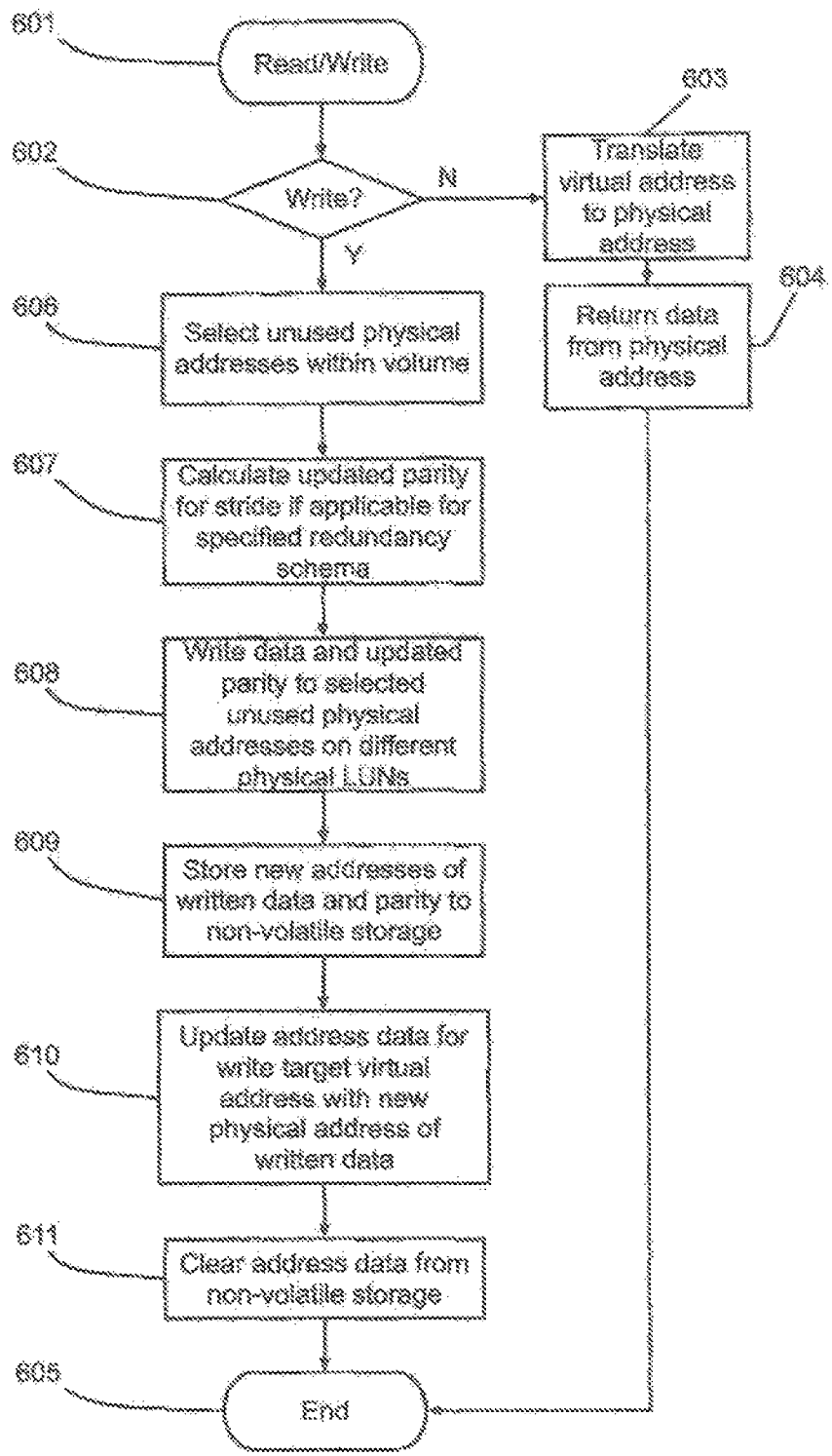
FIG. 6 is a flow chart illustrating a process of reading data from or writing data to a virtual volume.

With reference to FIG. 6, processing performed by the RAID controller program 109 when performing a read or write to one of the virtual volumes 201, 202, 203, 204 is shown. Processing is initiated at step 601, in response to a read or write request being received by the RAID controller program 109 for the relevant virtual volume. At step 602, if the request is a read request processing then moves to step 603. At step 603, the public virtual logical address 402 is translated via its corresponding internal virtual logical address 206 and then to its corresponding physical logical address 403 via the address-mapping table 401. At step 604, the relevant data is retrieved from the identified physical logical address 403 and returned to the requestor as if it had come from the corresponding public virtual logical address 402. Processing then ends at step 605.

At step 602, if the request is identified as a request to write new primary data, processing then moves to step 606. At step 606, two new unused physical addresses are selected within the virtual volume allocation. These two new addresses are not selected from the same physical storage elements 106 as any remaining physical addresses for the relevant stride, that is, for any of the physical addresses in the stride except the write target physical address. At step 607, new redundancy data is calculated to take into account the new primary data. As will be understood by those skilled in the art, depending on the relevant redundancy schema 205, the existing primary or redundancy data may need to be read in order to create the updated redundancy data. Also, where a given write does not overwrite all existing primary data with new primary data at given internal virtual logical address, all of the primary and redundancy data for the relevant address is read even though this data will not be updated with the new primary data.

Processing then moves to step 608, where the new primary data and the updated redundancy data are written to respective ones of the new physical address. In addition, where the write does not overwrite all of a given internal virtual logical address as described above, the remaining primary data and redundancy data for the relevant internal virtual logical address are also written to the new physical addresses. Next, at step 609, the two new physical addresses and the write target address are recorded in non-volatile memory and processing moves to step 610. At step 610, the write internal virtual address 206 for the write target address and the corresponding parity data link addresses 405 for the stride are updated with the respective new physical addresses from the non-volatile memory so as to update the address mapping table with the written primary data and associated updated redundancy data. The write is then acknowledged as complete and processing moves to step 611 where the non-volatile memory is cleared and processing then ends at step 605.

Figure 7:
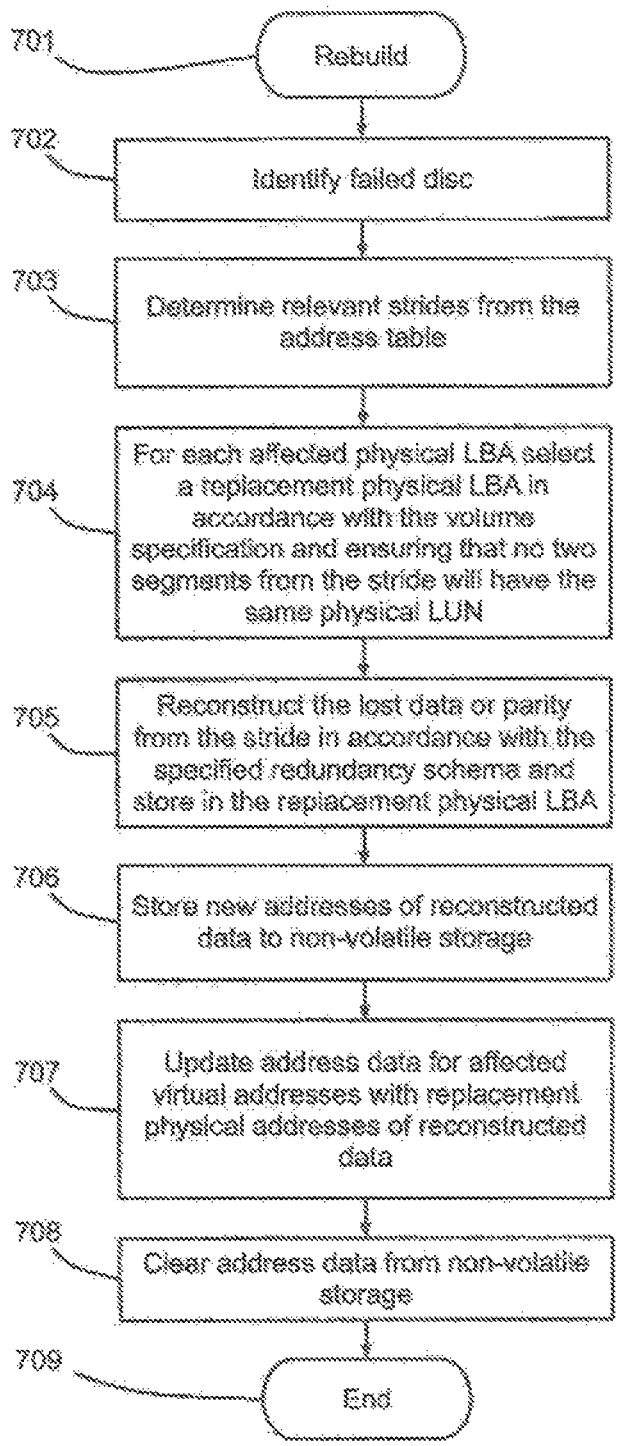
FIG. 7 is a flow chart illustrating a process of rebuilding a virtual volume in response to a failure of an associated storage device.

Referring to FIG. 7, processing performed by the RAID controller program 109 when rebuilding one of the virtual volumes 201, 202, 203, 204 in response to the failure of a storage element 106 is shown. Processing is initiated at step 701, in response to the detection of a failed physical storage element and then moves to step 702 where the failed physical storage element is identified. At step 703, the address-mapping table 401 (shown in FIG. 4) is inspected to identify all strides of all virtual volumes that have a mapping to one or more physical logical address on the affected physical storage device. Processing then moves to step 704, where for each affected physical logical address, a replacement physical logical address is selected from a different physical storage element than that for any existing physical logical address for the relevant stride. At step 705, the redundancy data for the stride is identified and used to reconstruct the data for the affected physical logical address and stored in the relevant replacement physical logical address. Processing then moves to step 706, where the replacement physical logical address and the corresponding affected internal virtual logical address 206 are written to non-volatile memory. At step 707, the affected internal virtual address 206 is updated with the replacement physical logical address to update the address-mapping table with the written rebuilt data. Processing then moves to step 708 where the replacement physical logical address and the corresponding affected internal virtual logical address 206 are cleared from the non-volatile memory. When all the affected physical logical address have been rebuilt as described above, the rebuild is acknowledged. Processing then ends at step 605.

Figure 8:
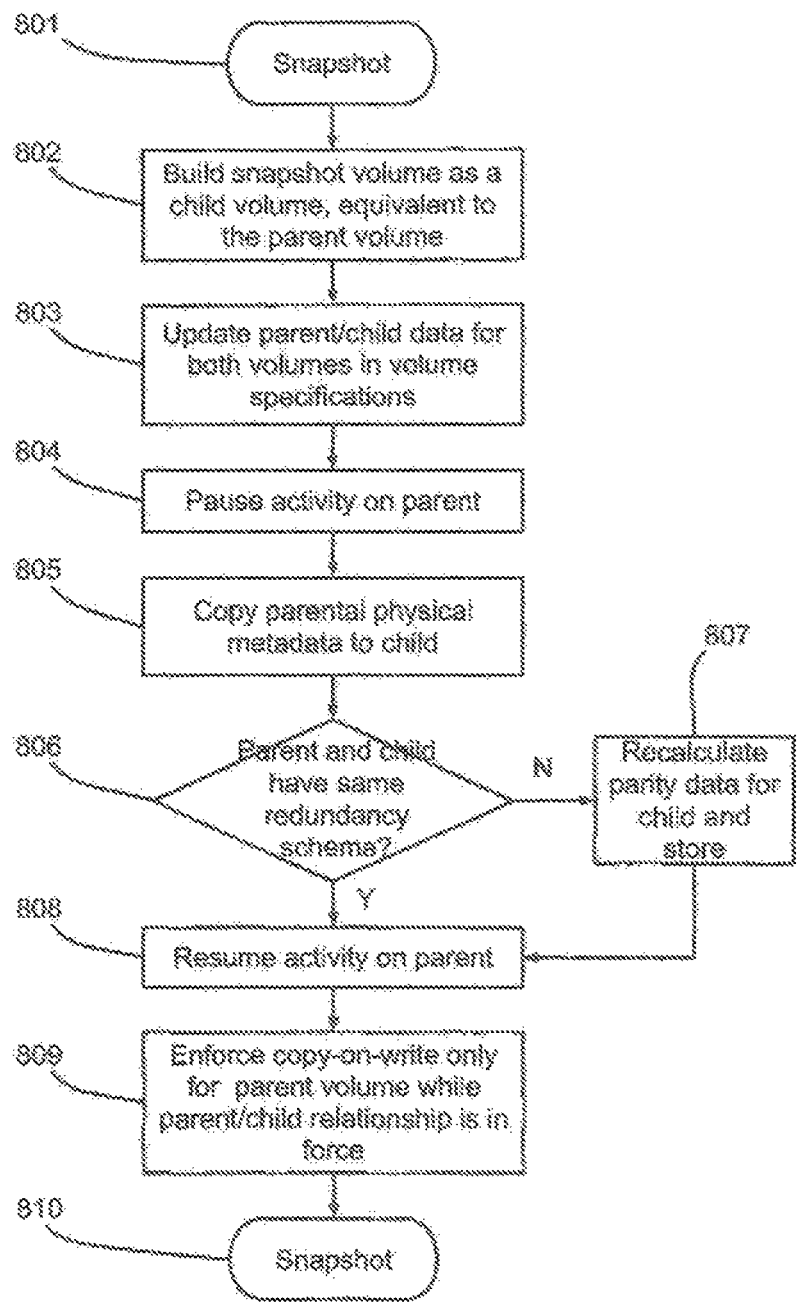
FIG. 8 is a flow chart illustrating a process of creating a snapshot of a virtual volume.

With reference to FIG. 8, processing performed by the RAID controller program 109 when creating a snapshot of one of the virtual volumes 201, 202, 203, 204 is shown.

Processing is initiated at step 801, in response to a user command to create a snapshot of a selected virtual volume. At step 802, a new volume is built that is equivalent to the parent volume in accordance with the processes described with reference to FIG. 5 and processing moves to step 803. At step 803, the parent/child volume settings 306 are updated to indicate the parent-child relationship between the new snapshot volume and its parent. Processing then moves to step 804 where the activity on the parent is paused. At step 805, the set of physical addresses 403 for the parent volume are copied to the address mappings for the snapshot volume and, at step 806, if the parent and child have different redundancy schemas 205 then processing moves to 807. At step 807, new parity data for the snapshot volume is calculated and written for the snapshot volume in new physical addresses for each respective stride in accordance with the write process of FIG. 6. Processing then moves to step 808 where activity on the parent volume is resumed. At step 806, if the parent and child have the same redundancy schemas then processing moves directly to step 808. From step 808, processing moves to step 809, where a requirement is set for the parent volume that all writes are performed using the copy-on-write process, as described in FIG. 6, for the duration of the parent/child relationship. Processing then ends at step 810.

In another embodiment, the allocation of physical addresses is "lazy". In so-called "lazy" physical address allocation, the physical logical addresses are initially set to a special value indicating a block logically filled with zeroes. A given block is not allocated until the first write to that block. A usage count is maintained for each block of each physical storage element, which is incremented when the block is first written to. Blocks with a zero usage count are considered free and may be allocated for storage. When a block is allocated, the selection of the actual physical address needs to account for the restriction that no two physical addresses in a given stride can reside on the same physical storage device. Reservation of segments for certain volumes and over-provisioning may also be provided.

In a further embodiment, a usage count is maintained for each block of each physical storage element. The usage count is incremented when a block is first written and the physical address allocation is performed as a given virtual volume is built. Thus, the physical address allocation is not lazy in this embodiment. For the first write to a given physical address, indicated by a zero usage count, the write can be performed in-place rather than using a copy-on-write mechanism. However, if a parent/child relationship is in force for a given set of virtual volumes, write-in-place is barred to preserve the integrity of the parent/child virtual volumes.

In another embodiment, in order to reduce the number of writes required for each individual write, the metadata changes are stored in a metadata journal in a power persistent buffer. The updated metadata is then periodically checkpointed to the address-mapping table. This mechanism may be used for any metadata changed such as those resulting from rebuilds or snapshots. Such writes may result from the normal write process, from building, rebuilding, or snapshot processes.

In a further embodiment, for short random writes, such as 16 KiB and smaller, the metadata journal is extended to allow such writes to be done in-place atomically. This avoids the need to perform segment-long reads and writes for each short random write.

In another embodiment, improved response time can be achieved by pre-emptively reconstructing data when a particular member is slow to read operations, and by avoiding selecting members that are responding slowly to writes. Further, selecting a different storage component if the first component selected is taking an excessive amount of time to respond.

In the event of a system failure while there are active writes, the parity of a stripe may become inconsistent with the data. If this is not detected and repaired before a disk or block fails, data loss may ensue as incorrect parity that will be used to reconstruct the missing block in that stripe. This potential vulnerability is sometimes known as the "write hole" or "RAID write hole". Embodiments of the invention inhibit the RAID write hole from occurring in an economic manner with the use of a relatively small non-volatile buffer to store metadata updates for a given write in case the write is interrupted. When rebuilding a virtualized RAID array, since all drives in the storage pool can be used to the rebuild, it can occur more quickly than traditional rebuilds. Additionally, if sufficient unallocated space is available in the array, there is no need to take in a hot spare for the rebuild. Member indices or identifiers should not be re-used until a rebuild for a component has completed so that its member index is not already elsewhere in the metadata. New disks can be allocated unused member indices, so disks can be replaced before a failure has occurred. This mechanism also enables the array to be expanded when required. Chaining volumes using the parent/child mechanism described above provides a computationally cheap mechanism for creating space-efficient snapshots when lazy allocation used.

As will be understood by those skilled in the art, embodiments of the invention may be coupled with heterogeneous pools of storage elements, comprising a number of tiers of a given storage element type. A given virtual volume may comprise physical storage from a combination of the tiers of the storage pool. In other words, a virtual volume may utilize a number of different physical storage types. Each virtual volume may be provided with a set of requirements or preferences for the type of storage element they should be allocated. Such requirements or preferences may be stored in the virtual volume settings table. Thus in any process where physical storage is allocated, such as the build, write, rebuild or snapshot processes, the appropriate storage type may be selected in accordance with the stated requirements or preferences for the virtual volume as defined in its settings. In addition, the type of storage selected may be dependent on the process being performed. For example, for a rebuild operation of a well-used storage element, the highest performance replacement storage element may be selected so as to speed up the rebuild process. Similarly, in a rebuild process, the data for the rebuild may be selected for retrieval from the redundant data blocks on the fastest physical storage elements.

In such arrangements it may be appropriate to employ Hierarchical Storage Management (HSM) techniques to manage the allocation of the various types of storage. For example, such HSM systems may be arranged to migrate data to an appropriate tier based on actual usage. For example, such usage may be measured at stride level or block level. Such migration may be performed contrary to the preference settings for a given volume. For example, while a volume has a preference of slower cheaper an HSM migration process may migrate heavily used data to faster storage type.

As will be understood by those skilled in the art, each physical storage element or member in the pool of such devices used in the embodiment described above may be divided into a number of segments of a defined size for an array, such as 1 MiB. Each segment on a member is given an index, calculable from its LBA. The size of an array and segment is selected such that a segment address is a useful size, such as 32 bits.

As will be understood by those skilled in the art the metadata for the virtualized RAID array and each of the virtual volumes provided may be backed up or mirrored on the virtualized RAID array.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method, comprising:
   receiving a specified stride width for a virtual storage volume, wherein the stride width indicates a number of physical storage elements for the virtual storage volume;
   initializing a set of physical addresses to a pre-determined value, wherein each physical address comprises a block of a physical storage element;
   for each block of each physical storage element, maintaining a corresponding usage count information for the block, wherein the corresponding usage count information is adjusted in response to an initial write to the block; and
   in response to receiving an initial write request to write primary data to a public virtual address of a public address space for the virtual storage volume for the first time, selecting a first physical address and a second physical address from the set of physical addresses for providing physical storage for the primary data and parity data corresponding to the primary data, respectively;
   wherein the first physical address and the second physical address are selected based on usage count information for each block of each physical storage element and the set of physical addresses, such that no two physical addresses in the stride width can reside on the same physical storage element; and
   wherein an address mapping table for the virtual storage volume is updated to include information indicative of a first internal virtual address of a different address space that both the public virtual address and the first physical address are mapped to, a second internal virtual address of the different address space that the second physical address is mapped to, a first link for the first internal virtual address to the second internal virtual address to cross-reference the first physical address providing physical storage for the primary data with the second physical address providing physical storage for the redundancy data, and a second link for the second internal virtual address to a range of internal virtual addresses including the first internal virtual address to cross-reference the second physical address providing physical storage for the redundancy data with all physical addresses providing physical storage for the primary data.

2. The method of claim 1, wherein:
   the different address space is larger than the public address space; and
   each physical address initialized to the pre-determined value comprises a block of a physical storage element logically filled with zeroes.

3. The method of claim 1, wherein:
   a block of a physical storage element is available for allocation in response to setting a corresponding usage count information for the block to zero.

4. The method of claim 1, further comprising:
   for each block of each physical storage element, incrementing a corresponding usage count information for the block in response to an initial write to the block.

5. The method of claim 1, further comprising:
   selecting a redundancy schema, wherein the redundancy data is based on the redundancy schema selected.

6. The method of claim 5, wherein the redundancy schema is a Redundant Array of Independent Discs (RAID) schema.

7. The method of claim 5, further comprising:
   maintaining a buffer for storing one or more updates for the primary data.

8. The method of claim 7, wherein the buffer comprises a power persistent buffer.

9. The method of claim 7, wherein the updates include at least one metadata change.

10. The method of claim 1, wherein:
    in response to receiving a subsequent read request to read the primary data written to the public virtual address:
    translating the public virtual address to the first internal virtual address based on the address mapping table;
    translating the first internal virtual address to the first physical address based on the address mapping table; and
    retrieving the primary data from the first physical address.

11. A computer program product for providing redundancy in a virtualized storage system, the computer program product comprising a computer readable storage medium having program instructions embodied therewith, the program instructions executable by a processor to cause the processor to:
    receive a specified stride width for a virtual storage volume, wherein the stride width indicates a number of physical storage elements for the virtual storage volume;
    initialize a set of physical addresses to a pre-determined value, wherein each physical address comprises a block of a physical storage element;
    for each block of each physical storage element, maintain a corresponding usage count information for the block, wherein the corresponding usage count information is adjusted in response to an initial write to the block; and
    in response to receiving an initial write request to write primary data to a public virtual address of a public address space for the virtual storage volume for the first time, select a first physical address and a second physical address from the set of physical addresses for providing physical storage for the primary data and parity data corresponding to the primary data, respectively;
    wherein the first physical address and the second physical address are selected based on usage count information for each block of each physical storage element and the set of physical addresses, such that no two physical addresses in the stride width can reside on the same physical storage element; and
    wherein an address mapping table for the virtual storage volume is updated to include information indicative of a first internal virtual address of a different address space that both the public virtual address and the first physical address are mapped to, a second internal virtual address of the different address space that the second physical address is mapped to, a first link for the first internal virtual address to the second internal virtual address to cross-reference the first physical address providing physical storage for the primary data with the second physical address providing physical storage for the redundancy data, and a second link for the second internal virtual address to a range of internal virtual addresses including the first internal virtual address to cross-reference the second physical address providing physical storage for the redundancy data with all physical addresses providing physical storage for the primary data.

12. The computer program product of claim 11, wherein:
the different address space is larger than the public address space; and
each physical address initialized to the pre-determined value comprises a block of a physical storage element logically filled with zeroes.

13. The computer program product of claim 11, wherein:
a block of a physical storage element is available for allocation in response to setting a corresponding usage count information for the block to zero.

14. The computer program product of claim 11, the program instructions executable by the processor to further cause the processor to:
for each block of each physical storage element, increment a corresponding usage count information for the block in response to an initial write to the block.

15. The computer program product of claim 11, the program instructions executable by the processor to further cause the processor to:
select a redundancy schema, wherein the redundancy data is based on the redundancy schema selected.

16. The computer program product of claim 15, wherein the redundancy schema is a Redundant Array of Independent Discs (RAID) schema.

17. The computer program product of claim 15, the program instructions executable by the processor to further cause the processor to:
maintain a buffer for storing one or more updates for the primary data.

18. The computer program product of claim 17, wherein the buffer is a power persistent buffer.

19. The computer program product of claim 17, wherein the updates include metadata changes.

20. The computer program product of claim 11, the program instructions executable by the processor to further cause the processor to:
in response to receiving a subsequent read request to read the primary data written to the public virtual address:
translate the public virtual address to the first internal virtual address based on the address mapping table;
translate the first internal virtual address to the first physical address based on the address mapping table; and
retrieve the primary data from the first physical address.

* * * * *